United States Patent [19]

Lamort

[11] Patent Number: 4,818,339

[45] Date of Patent: * Apr. 4, 1989

[54] METHOD AND DEVICE FOR PREPARATION AND PRIMARY SEPARATION OF PAPER PULP

[75] Inventor: Pierre Lamort, Vitry Le Francois, France

[73] Assignee: E et M Lamort, France

[*] Notice: The portion of the term of this patent subsequent to Aug. 5, 2003 has been disclaimed.

[21] Appl. No.: 890,616

[22] Filed: Jul. 25, 1986

[30] Foreign Application Priority Data

Jul. 26, 1985 [FR] France .................................. 85 11453

[51] Int. Cl.⁴ .......................... D21B 1/08; D21C 9/08
[52] U.S. Cl. .......................................... 162/4; 162/55; 162/57; 241/46.17
[58] Field of Search ................... 241/46.17; 162/4, 55, 162/57

[56] References Cited

U.S. PATENT DOCUMENTS

| | | | |
|---|---|---|---|
| 2,727,439 | 12/1955 | Bolton et al. | 162/57 X |
| 4,397,713 | 8/1983 | Lambrecht | 162/4 X |
| 4,604,193 | 8/1986 | Lamort | 162/55 X |

Primary Examiner—Peter Chin
Assistant Examiner—Thi Dang
Attorney, Agent, or Firm—Darby and Darby

[57] ABSTRACT

Method and device for preparation and primary separation of paper pulp in which the initial disintegration is produced in a primary pulper 1 of known type, the contents of the pulper, after this separation is discharged directly and discontinuously into a large-sized vat where it is stirred by an agitator with longitudinal shaft equipped with spiral arms, and from there poured discontinuously into a separator.

9 Claims, 1 Drawing Sheet

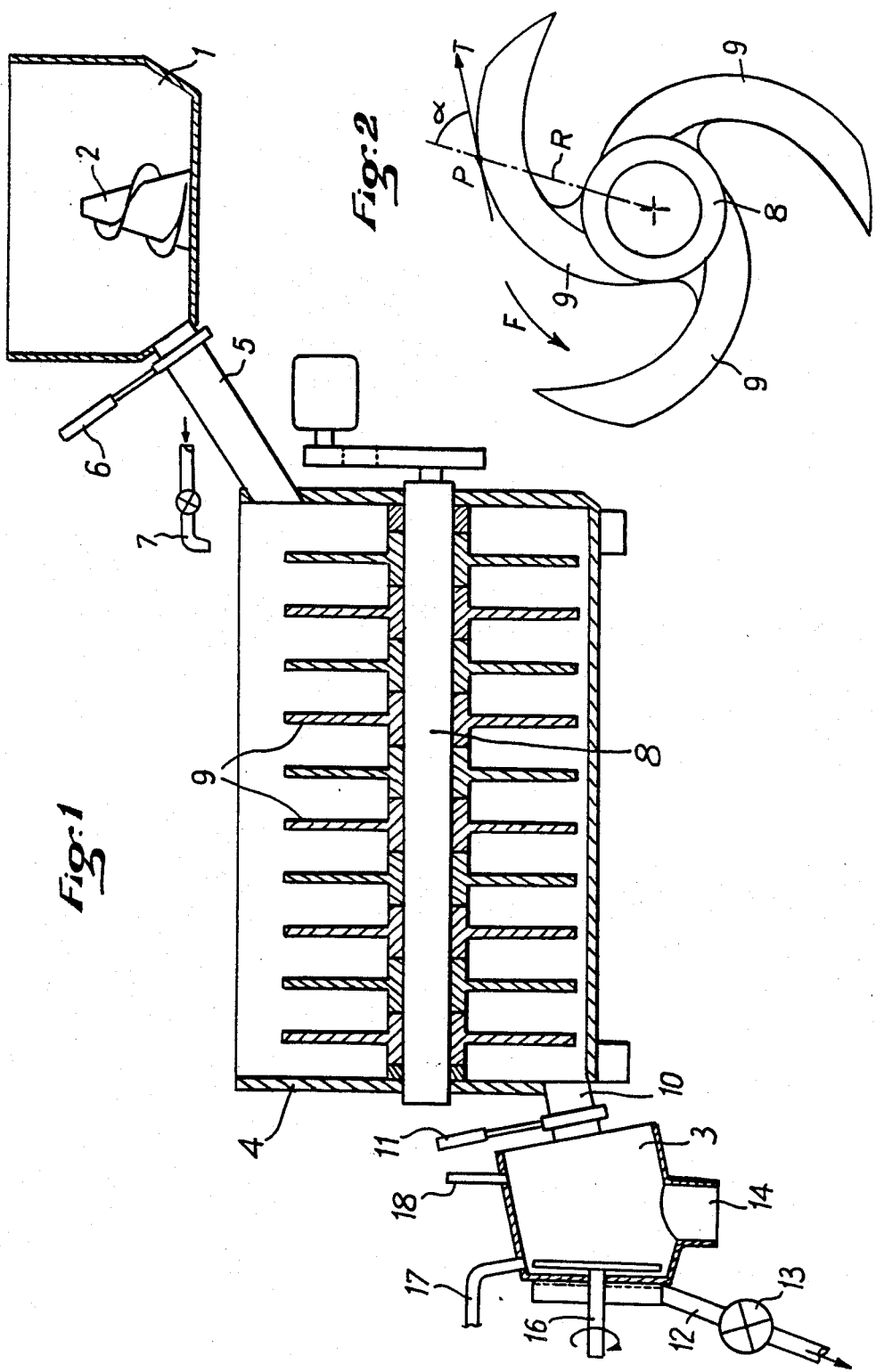

METHOD AND DEVICE FOR PREPARATION AND PRIMARY SEPARATION OF PAPER PULP

French Patent No. 83,04929 filed Mar. 25, 1983 under the title "Method and Device for Separating a Mixture of Paper Pulp and Impurities", describes a discontinuous washing device which can operate immediately below a primary pulper of the Helico type which by itself performs no separation.

Experience teaches, however, that these means are not without their drawbacks for several reasons. The separation device according to French patent No. 83,04929 treats the contents of a primary pulper in a few minutes, and must be able to absorb the entire contents of the pulper in one or two passes. When the proportion and the volume of the contaminants are very high, which is the case for papers coated with polyethylenes, and these are bcoming more and more frequent, there is a limit of about 20% on the proportion of contaminants in the old paper in the pulper. Otherwise, the separation becomes impossible, since the device cannot properly process such a quantity of contaminants. Furthermore, this leads to the use of separators of large volume, which are expensive. This is not economical since such separators work for only brief periods of time.

Moreover, since the pulper and separator operate discontinuously, it is necessary to provide a large-sized vat below, in which the pulp is thinned out and which serves as a buffer volume beyond which the rest of the process of elaboration of pulp into paper can follow continuously. For a pulper of about 10 m$^3$ with a concentration of 15-20%, a vat on the order of 50 to 100 m$^3$ is needed, in which the pulp is diluted to 5% and which serves as an initial volume for the continuous process. Such a vat generally has a high-speed helical agitator that constantly stirs the mixture.

According to the invention, the operation follows a different pattern, in which the papers are disintegrated in a primary pulper of the Helico type and are discharged discontinuously into a vat with an agitation shaft having arms or blades in the form oa logarithmic spiral with a small angle, on the order of 20° to 30°. The mass of pulp and contaminants thus agitated in the vat are supplied discontinuously to a separator of the type described in French Patent No. 83,04929 connected to the vat.

It is thus possible to operate the separator at a cadence discontinuity that is entirely different from that of the pulper and practically uninterruptedly, and the contents of the pulper can be separated, for example in ten successive operations and no longer in just one, or a maximum of two.

The method and apparatus of the invention has substantial advantages in that the pulper can work with practically no interruptions except for draining and refilling. The separator can also work without interruption adn its volume can be small.

In accordance with the invention, the concentration in the vat can be regulated to facilitate the work of the pulper. Also, it is possible with no difficulty to use up to 100% of plastified papers, such as of the type of papers covered with polyethylene, which is an enormous advantage.

The continuous feed to the downstream circuit can be embodied either by interposition of a small-sized vat or by the use of twinned separators such as those described in French Patent No. 83,04929. However, this process is made possible only by the use of a vat with spiral-arm agitation. As a matter of fact, if the agitators employed are the ones commonly used in the vats, the contaminants of the plastic sheet type rapidly bank up on the agitator and jamming occurs. With agitation by spiral arms with a small angle, the plastics slide along the blades without catching or shredding so that the entire bath is continuously stirred and the separator can function without problems.

The invention also leads to energy savings owing to the reduction in the power needed for the separator which operates more frequently but on smaller quantities.

The invention envisages the combination in sequence of a primary pulper and a vat which is agitated by a plurality of blades, or arms, in the shape of a Bernouilli spiral with small angle, mounted on a shaft which extends along the longitudinal axis of the vat. The vat is preferably connected to at least one separator of the type described in French Patent No. 83,04929, and there also may be a connection to the vat for water for dilution. It also envisages that in the agitation vat the arms in the shape of a Bernouilli spiral have a small angle on the order of 20° to 30°, disposed approximately in planes perpendicular to the axis of the vat.

A preferred embodiment of the invention is illustrated in the attached drawing in which:

FIG. 1 is a diagram of the system; and

FIG. 2 illustrates the form of the arms on the agitator shaft of the vat in FIG. 1.

Referring to FIG. 1, it is evident that the combination according to the invention is constituted by the following, disposed in sequence. First there is a primary pulper 1 of known type, such as a pulper of the Helico type, incorporating a spiral centrifugal disintegrating agitator 2. Such agitators do not perform any separation. They only project the mixture of papers and contaminants violently onto the walls of the apparatus where the fiber becomes detached and disintegrates while the plastic sheets and other large-surfaced contaminants are not disintegrated. The pulpers operate in open vat, at high concentrations on the order of 15 to 20% dry materials. It is also possible to use known pulpers having a bottom grid for performing a first separation of pulp; but within the scope of the present invention this use offers no special advantages since the total separation is sufficiently completed in the separator 3.

There is a vat 4 of large size, several times the volume of the pulper, with which the pulper 1 communicates through a duct 5 controlled by valve 6. If desired, a water input 7 is provided to the vat. The agitator member of vat 4 is a longitudinal shaft 8 bearing arms, or blades, 9 whose shape is a Bernouilli spiral with small angle, as shown in FIG. 2.

The expression, shaped in a Bernouilli spiral of small angle, stands for arms developing from the shaft with an angle alpha that is approximately constant between each radius R and the tangent T to the arm at point P through which this radius passes. The arms preferably have a rounded section to avoid shredding the material. The arms 9 rotate at a relatively low speed, for example 2 to 10 rpm, in the direction of arrow F, so that the contaminants tend to slide along the arms.

At least one separator 3, for example of the type according to French Patent No. 83,04929, is linked to vat 4 by a duct 10 controlled by valve 11. The other members of the separator 3 are described in the said French Patent No. 83,04929. At 12 is the outlet for the pulp directed to pump 13 and thence to the general circuit. At 14 is the waste outlet. A spatial agitator 15 is driven by shaft 16. The separator has a water input 17 and a vent 18.

The operation is as follows. Once the disintegration is completed in pulper 1, valve 6 is opened and all the contents of the pulper is discharged into vat 4. The pulper 1 can then be refilled immediately and will operate again, valve 6 being reclosed. The pulper cycle lasts about ½ to 1 hour.

During this time the bath is continuously agitated in the vat 4, and regularly picket up intermittently by duct 10. Valve 11 is opened and the separator 3 is filled, then its agitator 16 is started up after valve 11 is closed. The operation of the separator takes 3 to 5 minutes approximately (time nonlimiting). The pulp is picket up by pump 13, the waste is washed, and a fresh operation can begin with a fresh filling of separator 3. It is therefore possible to run about 10 cycles of separation at 3 for 1 cycle of disintegration at 1.

By way of nonlimiting example, the pulper 1 can have a volume of 15 m$^3$, the vat 4 a volume of 75 m$^3$ and the separator 3 a volume of about 2 to 3 m$^3$. The concentration in the pulper 1 can be 15 to 20% of dry materials for 5 to 7% in vat 4 and separator 3.

The process and the combination of the invention are very flexible and can be adapted to each particular case as long as the volume of the vat 4 is at least 3 times as large as the useful volume of the pulper 1, and so that the volume of each treatment of separator 3 is preferably at least 3 to 5 times smaller than that of the pulper 1.

What is claimed is:

1. A method of preparation and primary separation of a paper pulp from a recycled paper and similar fibrous substances, comprising of the following steps:
   (a) agitating without shredding and cutting of a mixture of said fibrous substances in a primary pulper with a first agitator means situated within said primary pulper;
   (b) simultaneous discharging of the entire content of the primary pulper including the mixture of the fibrous substances and contaminants into a vat having a working volume substantially larger than a working volume of the primary pulper;
   (c) stirring the mixture within said vat with a second agitator means having a longitudinal shaft provided with spiral-shaped blades extending from said shaft;
   (d) discharging the mixture from the vat into a separator, and washing out the contaminants in the sseparator; and
   (e) removing the contaminants from the separator.

2. Method according to claim 1, in which the volume of the vat is at least substantially about 3 times that of the pulper and the volume of the separator at least substantially about 3 to 5 times smaller than that of said pulper.

3. A method according to claim 1 wherein in the step "a" said first agitator means is a spiral centrifugal agitator, said centrifugal agitator projecting the mixture of the fibrous substances and contaminants so as to detach the fibrous substances while plastic elements and other largesurfaced contaminants remain integrated.

4. A method according to claim 3 wherein the step "a" said centrifugal agitator does not perform any separation.

5. A method according to claim 1 further comprising controlling the flow of said mixture between said primary pulper and said vat.

6. A method according to claim 1 wherein in the step "c" the blades have a shape of Bernouilli spiral with a small angle.

7. A method according to claim 6 wherein said spiral having a substantially small angle between a radius extending from a center of the shaft and a line tangential to an outside surface of the blade at a point where the radius crosses the outside surface of the blade.

8. A method according to claim 7 wherein during the step "c" plastic pieces of said mixture slide along the surface of the blades and remain integrated.

9. A method according to claim 1 wherein the blades of the vat are each shaped as a logarithmic spiral having a small angle between a radius extending from a center of the shaft and a line tangential to an outside surface of the blade at a point where the radius crosses the outside surface of the blade, said angle extending between 20° and 30°.

* * * * *